April 27, 1937.   R. R. HARRIS   2,078,756
TRACKING CONNECTION FOR VEHICLES
Filed Jan. 22, 1936   2 Sheets-Sheet 1
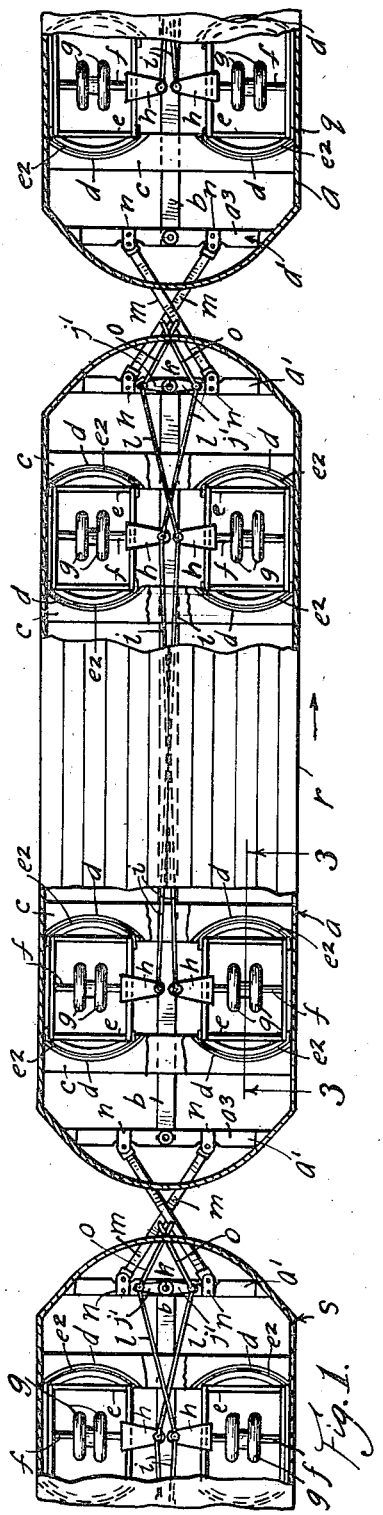
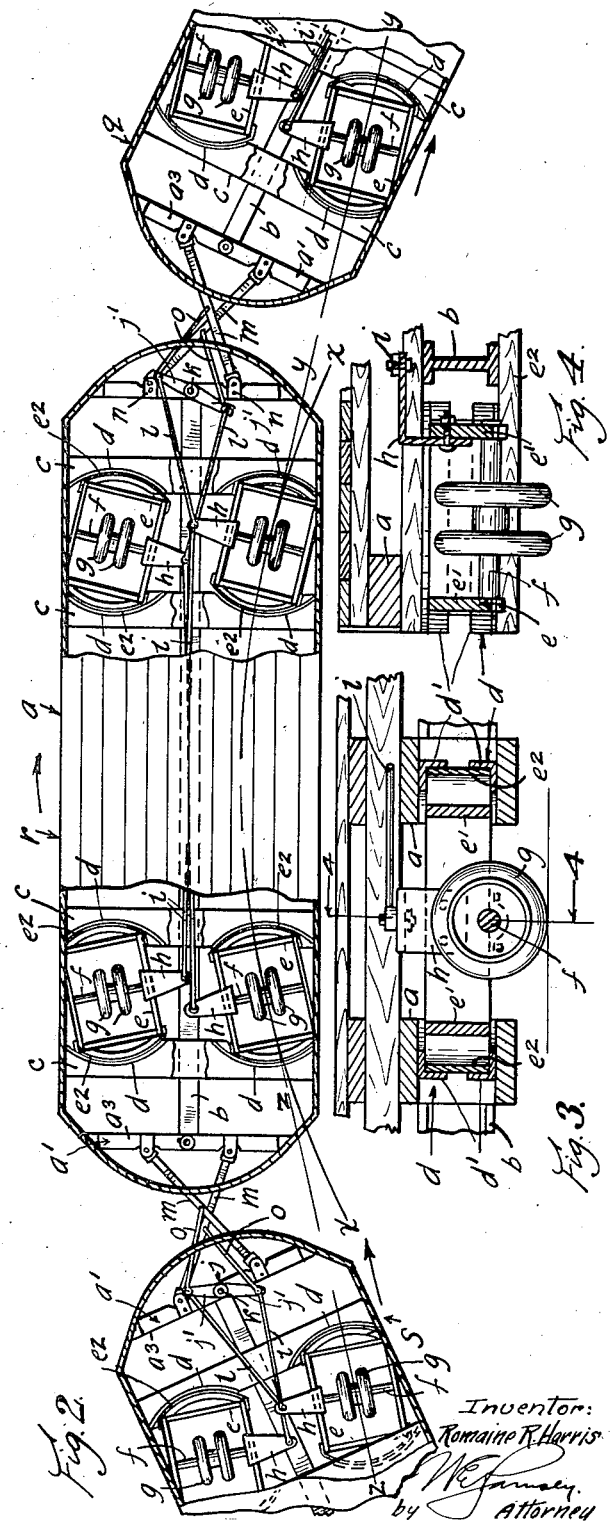
Inventor:
Romaine R. Harris
by *[signature]*
Attorney April 27, 1937.  R. R. HARRIS  2,078,756
TRACKING CONNECTION FOR VEHICLES
Filed Jan. 22, 1936   2 Sheets-Sheet 2
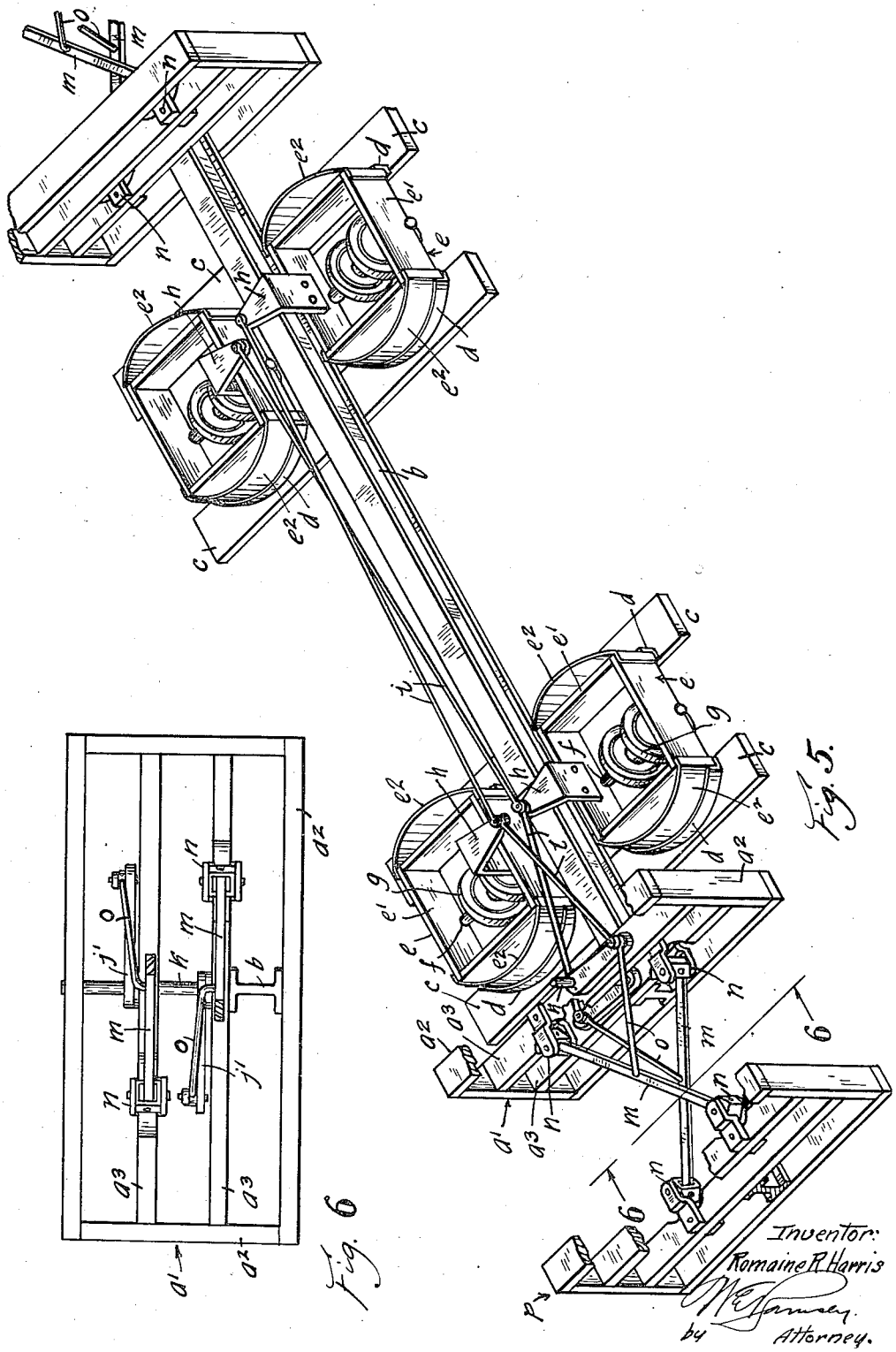

Patented Apr. 27, 1937

2,078,756

UNITED STATES PATENT OFFICE 2,078,756

TRACKING CONNECTION FOR VEHICLES

Romaine R. Harris, Portland, Oreg.

Application January 22, 1936, Serial No. 60,182

14 Claims. (Cl. 280—99)

The principal object of my invention is to provide vehicles having dirigible wheels and steering connections therefor which vehicles may be arranged in a train comprising a plurality of units connected together in trailing relation and secured to each other by crossed coupler elements. Steering means is provided for the wheels and said steering means is operatively connected with said crossed coupler elements so that each vehicle of said train is directed by the movement of the preceding unit to take exactly the position previously occupied by the latter at any given point.

By my invention a train made up in this manner is capable of traversing a tortuous path under the direction of a single operator. Said operator has only to drive the first unit or truck and said coupling and steering connections automatically bring the successive trucks into position to assume the same position and the same angularity the leading truck did when it traversed said point.

A further object of my invention is to provide steering means for vehicles of this character which are of simple construction, efficient in operation, are sturdy and are inexpensive to manufacture.

This application is intended as a continuation in part of applicant's co-pending application for patent entitled Steering apparatus for multi-wheel vehicles, Serial No. 27,499 filed June 20, 1935.

Further details of my invention and their mode of operation are hereinafter described with reference to the accompanying drawings in which:

Fig. 1 shows a vehicle embodying my invention shown connected between portions of two connected vehicles, said vehicles being arranged in trailing relation and being alined as when traversing a straight path;

Fig. 2 is a similar view of said vehicles with portions of the adjacent connected vehicles, showing the operating portions as arranged when traversing a curved path;

Fig. 3 is a sectional view taken on the line 3—3 in Fig. 1;

Fig. 4 is a sectional view taken on the line 4—4 in Fig. 3 thru one of the wheel elements and its supporting truck;

Fig. 5 is a more or less diagrammatic view of the running gear and the steering and operating connections thereof shown with the body removed and with portions shown broken away to illustrate the relation of the parts and the operation thereof; and Fig. 6 is a sectional view looking at the forward end of a vehicle embodying my invention taken substantially on the line 6—6 in Fig 5.

My invention has particular application to cargo hauling, logging and in similar industries where it is desirable and permissible to haul loads upon a plurality of units arranged in trailing relation. It has particular application in trains of units made up in this manner which are to be directed along a tortuous path by a single operator. Each or any of said units may be self-propelled to gain traction for the entire train, or only the forward one may be propelled and the remainder drawn thereby. In any case, the units are secured together so that they have fixed spacing in said train and are arranged so that the angularity of each unit is controlled by the preceding unit.

A vehicle or unit embodying my invention comprises a frame $a$ which is preferably built about a longitudinally extending structural element $b$. Said member lies along the longitudinal center line of the frame and defines a backbone or keel for the vehicle. Extending laterally therefrom are a plurality of transverse frame units $c$. At opposite sides of the center of the frame $a$ are circular tracks or races $d$ for the wheel mountings $e$. Said tracks or races are truly circular and thus the wheel mountings rotate about fixed vertical axes.

The wheel mountings each comprise a rectangular frame element $e'$ which supports a transversely arranged axle $f$. I preferably provide dual wheels $g$ upon each of the axles and said wheels are arranged to lie at opposite sides of the vertical axis of rotation of each of the wheel mountings. This permits a swivel action about said vertical axis rather than requiring said wheels to "scrub" when being turned about said axis. Each wheel mounting has a circular guide face $e2$ formed upon the same arc as the track or race in which it is mounted and each track or race is provided with a plurality of opposed flanges $b'$ which bear upon the edges and face of the guide faces $e2$, as is shown in Figs. 3 and 4. This structure is the most simple one but it is to be understood that any type of bearing permitting the wheel mountings to have rotation about a vertical axis might be provided. To secure easy action anti-friction bearings can be used and the guide faces and tracks or races constructed to receive said anti-friction bearings.

Each wheel mounting is provided with an upstanding laterally disposed steering arm $h$ and all of said arms are arranged so that the free ends thereof overlie substantially the longitudinal center line of the body, as is shown in Fig. 1. The different steering arms preferably lie at different vertical levels, however, as will hereinafter be pointed out.

Said steering arms are connected with the diagonally disposed steering arms at the other end of said vehicle, as is shown in Fig. 5. Thus, the front right wheel mounting is connected to the left rear mounting by a tie rod $i$. The two remaining wheel mountings are similarly secured together. Thus the angular displacement of the front wheels produces a similar angular displacement of the rear wheels thru equal but opposite angles, as is indicated in Fig. 2.

The front wheel mountings are secured to the free ends of a rocker arm element $j$ pivotally mounted upon a vertically extending pivot pin $k$. Said rocker arm is not a single member but comprises two levers $j'$ arranged at different vertical levels, which levers are capable of independent rotation about the pivot pin. The pivot pin is secured thru a lattice frame element $a'$ secured to the forward end of the frame element $a$, as is shown in Figs. 5 and 6. Said lattice frame element comprises bounding members $a2$ and transverse vertically spaced intermediate members $a3$. The upper intermediate member supports one of the rocker arm levers and the lower intermediate member the other rocker arm lever. The connections from one rocker arm lever to the diagonally disposed front wheel steering arm is made there by a link $l$. Another link $l$ connected to the free end of the opposite lever is also diagonally disposed and connects to the other front steering wheel lever. Thus, the rocker arm levers, the steering links, steering arms and the tie rods are arranged in two sets. Each set is arranged upon a different vertical level and thus free to operate without interference to the other set.

The separate units or vehicles of the train are secured to each other by couplers comprising crossed members $m$ which are connected at their ends by universal joints $n$ to the frames of the units which they connect. Universal joints are provided to give an articulated connection between each of the units to permit said units to have relative vertical movement as well as horizontal movement. Connecting each of said cross members with the ends of the rocker arms $j$ are steering links $o$. Said steering links are connected to the crossed members at points intermediate the ends of said members $m$, as is shown in Figs. 5 and 6. The other ends of said steering links $o$ are connected to the free ends respectively of the rocker arm levers $j'$ upon the same connecting pin as are the forward ends of the links $l$.

The forward ends of said crossed members are connected to a part of the frame $p$ comprising the body of the leading vehicle or unit. Said frame $p$ lies transversely of the frame of said leading vehicle as does the lattice frame $a'$ of the vehicle under consideration. Said frames are normal to the center lines of the vehicles respectively and thus lie parallel to each other when the vehicles are arranged in longitudinal alinement. The frame $p$ of said forward vehicle thus defines a base plane for directing the movement of the body of the trailing vehicle under consideration as well as the steering wheels therefor. Each angular movement of said frame $p$ is transmitted to the frame of the trailing vehicle as well as to the steering wheels thereof. This produces a change in angularity of the wheels of the trailing vehicle which brings the said trailing vehicle to a point where each vehicle occupies exactly the same position and the same angular relation to the roadway that the preceding one did as it passes over a fixed point.

It is to be noted that the wheels of the various vehicles are arranged upon fixed and definite wheel spaces as is shown in Fig. 1. The distance from the rear wheels of the forward vehicle $q$ are spaced the same distance from the front wheels of the central vehicle $r$ as are the front wheels of said vehicle from the rear wheels thereof. The same relation exists between the rear wheels of said vehicle $r$ and the front wheels of the trailing vehicle $f$. This produces uniformity in the vehicles and in their connections and operative parts. Each vehicle can thus conform to identical arcs and occupy the same relation therewith. For example, the vehicle $r$ in Fig. 2 is swinging about an arcuate path $x$—$x$. This arcuate path extends substantially only the length of said vehicle and merges into a straight path $y$—$y$ on its forward end and $z$—$z$ on its after end. Thus, when the trailing vehicle $s$ occupies the position now held by the vehicle $r$ it will assume the same position and will have the same degree of angularity and the wheels will be located exactly in the same manner as are the corresponding parts in the vehicle $r$.

I am of the opinion at the present time that said wheel spacing must be uniformly maintained throughout the length of the entire train, although I am unable to explain exactly why this should be. Experiments with vehicles having different wheels lengths do not produce exact tracking even tho the length of the connecting links and their relative arrangement are correspondingly changed. When vehicles having unequal wheel spacing are provided, the wheels tend to become out of alinement with their paths when traveling along a curved path, skid, and wear out the tires quickly and tend to lock the operating parts and interpose resistance along said path.

I claim:

1. In a series of vehicles connected in trailing alinement, each vehicle provided with a body and dirigible wheel elements, said wheel elements being susceptible of separate and independent movement with respect to each other, means for maintaining said wheel elements in predetermined relation with each of the other wheel elements, a coupler element extending between said vehicles and comprising a pair of crossed rigid and unitary members of fixed length each pivotally connected at its ends to the bodies of said vehicles, said coupler element constituting the drawbar between vehicles and operating connections joining said crossed members respectively to the wheel elements on the vehicle trailing said members.

2. In a series of vehicles connected in trailing alinement, each vehicle provided with a body and dirigible wheel elements, said wheel elements being susceptible of separate and independent movement with respect to each other, means for maintaining said wheel elements in predetermined relation with each other of the other wheel elements, a coupler element extending between said vehicles and comprising a pair of crossed rigid and unitary members of fixed length each pivotally connected at its ends to the bodies of said vehicles, said coupler element constituting the drawbar between vehicles by articulated connections and operating connections joining said crossed members respectively to the wheel elements on the vehicle trailing said members.

3. In a series of vehicles connected in trailing alinement, each vehicle provided with a body and dirigible wheel elements, said wheel elements being susceptible of separate and independent movement with respect to each other, each about its own fixed vertical axis, means for maintaining said wheel elements in predetermined relation with each of the other wheel elements, a coupler element extending between said vehicles and comprising a pair of crossed rigid and unitary members of fixed length each pivotally connected at its ends to the bodies of said vehicles, said coupler element constituting the drawbar between vehicles and operating connections joining said crossed members respectively to the wheel elements on the vehicle trailing said members.

4. In a series of vehicles connected in trailing alinement, each vehicle provided with a body and dirigible wheel elements, said wheel elements being susceptible of separate and independent movement with respect to each other, means for maintaining said wheel elements in predetermined relation with each of the other wheel elements, a coupler element extending between said vehicles and comprising a pair of crossed rigid and unitary members of fixed length each pivotally connected at its ends to the bodies of said vehicles, said coupler element constituting the drawbar between vehicles and operating connections joining said crossed members respectively to the wheel elements on the vehicle trailing said members, each wheel element comprising two wheels axially alined and lying at opposite sides of the vertical pivot axis for said wheel elements.

5. In a vehicle provided with a body and dirigible wheel elements, said wheel elements being susceptible of separate and independent movement with respect to each other, means for maintaining said wheel elements in predetermined relation with each of the others, a coupler element arranged upon the forward end of the vehicle body comprising a pair of longitudinally extending crossed rigid and unitary members of fixed length pivotally secured to the body of said vehicle, said coupler element constituting the drawbar between vehicles and operating connections securing said crossed members respectively to the wheel elements.

6. In a vehicle provided with a body and dirigible wheel elements, trucks carrying said wheel elements, said trucks being rotatably mounted beneath said body, each truck being susceptible of independent rotation about a fixed vertical axis, means for maintaining said wheel elements in predetermined relation with each of the others, a coupler element arranged upon the forward end of the vehicle body comprising a pair of longitudinally extending crossed rigid and unitary members of fixed length pivotally secured to the body of said vehicle, said coupler element constituting the drawbar between vehicles and operating connections securing said crossed members respectively to the wheel elements.

7. In a vehicle provided with a body and dirigible wheel elements, said wheel elements being susceptible of separate and independent movement with respect to each other, each about its own fixed axis, means for maintaining said wheel elements in predetermined relation with each of the others, a coupler element arranged upon the forward end of the vehicle body comprising a pair of longitudinally extending crossed rigid and unitary members of fixed length pivotally secured to the of said vehicle, said coupler element constituting the drawbar between vehicles and operating connections securing said crossed members respectively to the wheel elements.

8. In a vehicle provided with a body and dirigible wheel elements, said wheel elements being susceptible of separate and independent movement with respect to each other, steering means for maintaining said wheel elements in predetermined relation with each of the others, a coupler element arranged upon the forward end of the vehicle body comprising a pair of longitudinally extending crossed members of fixed length pivotally secured to the body of said vehicle, operating connections securing said crossed members respectively to the steering means for the wheel elements, said means for maintaining a predetermined relation between said wheel elements including laterally projecting arms operatively secured to each of said wheel elements, a pivot pin arranged upon the forward end of said body intermediate the coupler element and the forward wheels, a rocker element journaled on said pivot pin, links extending diagonally of the longitudinal center line of said vehicle body connecting the free ends of said rocker arm element to the diagonally disposed arm for the front wheel elements respectively, rods diagonally intersecting said longitudinal center line, each rod connecting the free end of the arm of one of the front wheel elements with that of the diagonally disposed rear wheel element, said operating connections including steering links diagonally disposed with regard to said longitudinal center line, and pivotally secured at one end intermediate the ends of one of the crossed members comprising the coupler element and the free ends of the rocker arm element.

9. In a vehicle provided with a body and dirigible wheel elements, trucks carrying said wheel elements, said trucks being rotatably mounted beneath said body, each truck being susceptible of independent rotation about a fixed vertical axis, steering means for maintaining said wheel elements in predetermined relation with each of the others, a coupler element arranged upon the forward end of the vehicle body comprising a pair of longitudinally extending crossed members of fixed length pivotally secured to the body of said vehicle, operating connections securing said crossed members respectively to the steering means for the wheel elements, said means for maintaining a predetermined relation between said wheel elements including laterally projecting arms secured to each of said trucks, a pivot pin arranged upon the forward end of said body intermediate the coupler element and the forward wheels, a rocker element journaled on said pivot pin, links extending diagonally of the longitudinal center line of said vehicle body connecting the free ends of said rocker arm element to the diagonally disposed arm for the front wheel trucks respectively, rods diagonally intersecting said longitudinal center line, each rod connecting the free end of the arm of one of the front wheel trucks with that of the diagonally disposed rear wheel trucks, said operating connections including steering links diagonally disposed with regard to said longitudinal center line, and pivotally secured at one end intermediate the ends of one of the crossed members comprising the coupler element and the free ends of the rocker arm element.

10. In a vehicle provided with a body and dirigible wheel elements, trucks carrying said wheel elements, said trucks being rotatably mounted beneath said body, each truck being susceptible of independent rotation about a fixed vertical axis, steering means for maintaining said wheel elements in predetermined relation with each of the others, a coupler element arranged upon the forward end of the vehicle body pivotally secured to the body of said vehicle and operating connections securing said crossed members respectively to the steering means for the wheel elements, said body comprising a single longitudinally extending frame element and a series of laterally spaced frame elements secured to said longitudinal frame element, said lateral frame elements rotatably carrying the mountings for the wheel trucks.

11. In a vehicle provided with a body and dirigible wheel elements, trucks carrying said wheel elements, said trucks being rotatably mounted beneath said body, each truck being susceptible of independent rotation about a fixed vertical axis, steering means for maintaining said wheel elements in predetermined relation with each of the others, a coupler element arranged upon the forward end of the vehicle body pivotally secured to the body of said vehicle and operating connections securing said crossed members respectively to the steering means for the wheel elements, said body comprising a single longitudinally extending frame element and a series of laterally spaced frame elements secured to said longitudinal frame element, said lateral frame elements rotatably carrying arcuate bearing members rotatably engaging said wheel trucks and defining a circular path about a fixed axis for guiding the rotation of said trucks.

12. In a vehicle provided with a body and dirigible wheel elements, said wheel elements being susceptible of separate and independent movement with respect to each other, steering means for maintaining said wheel elements in predetermined relation with each of the others, a coupler element arranged upon the forward end of the vehicle body comprising a pair of longitudinally extending crossed members of fixed length pivotally secured to the body of said vehicle, operating connections securing said crossed members respectively to the steering means for the wheel elements, said means for maintaining a predetermined relation between said wheel elements including laterally projecting arms operatively secured to each of said wheel elements, a pivot pin arranged vertically of said body and upon the forward end of said body intermediate the coupler element and the forward wheels thereon, a rocker element comprising two opposed levers independently journaled on said pivot pins, links extending diagonally of the longitudinal center line of said vehicle body connecting the free ends of said rocker arm element to the diagonally disposed arm for the front wheel trucks respectively and rods diagonally intersecting said longitudinal center line, each rod connecting the free end of the arm of one of the front wheel trucks with that of the diagonally disposed rear wheel trucks said operating connections including steering links diagonally disposed with regard to the longitudinal center line, and pivotally secured at one end intermediate the ends of one of the crossed members comprising the coupler element and the free ends of the rocker arm element.

13. In a vehicle provided with a body and dirigible wheel elements, said wheel elements being susceptible of separate and independent movement with respect to each other, steering means for maintaining said wheel elements in predetermined relation with each of the others, a coupler element arranged upon the forward end of the vehicle body comprising a pair of longitudinally extending crossed members of fixed length pivotally secured to the body of said vehicle, operating connections securing said crossed members respectively to the steering means for the wheel elements, said means for maintaining a predetermined relation between said wheel elements including laterally projecting arms operatively secured to each of said wheel elements, a pivot pin arranged upon the forward end of said body intermediate the coupler element and the forward wheels thereon, a rocker element journaled on said pivot pin, links extending diagonally of the longitudinal center line of said vehicle body connecting the free ends of said rocker arm element to the diagonally disposed arm for the front wheel trucks respectively, rods diagonally intersecting said longitudinal center line, each rod connecting the free end of the arm of one of the front wheel trucks with that of the diagonally disposed rear wheel trucks, said operating connections including steering links diagonally disposed with regard to the longitudinal center line, and pivotally secured at one end intermediate the ends of one of the crossed members comprising the coupler element and the free ends of the rocker arm element, the laterally projecting arms for said wheel elements, the levers comprising the rocker arm element, the links, rods and cross members of the coupler elements being arranged in two sets, each set lying upon a different level with respect to the other set.

14. In a vehicle provided with a body and dirigible wheel elements, trucks carrying said wheel elements, said trucks being rotatably mounted beneath said body, each truck being susceptible of independent rotation about a fixed vertical axis, steering means for maintaining said wheel elements in predetermined relation with each of the others, a coupler element arranged upon the forward end of the vehicle body comprising a pair of longitudinally extending crossed members of fixed length pivotally secured to the body of said vehicle, operating connections securing said crossed members respectively to the steering means for the wheel elements, said means for maintaining a predetermined relation between said wheel elements including laterally projecting arms secured to each of said trucks, the free ends of said arms extending transversely of and alined with the longitudinal center line of said vehicle body, a pivot pin arranged vertically of said body and upon the forward end of said body intermediate the coupler element and the forward wheels thereon, a rocker element comprising two opposed levers independently journaled on said pivot pin, links extending diagonally of said longitudinal center line connecting the free ends of said rocker arm element to the diagonally disposed arm for the front wheel trucks respectively and rods diagonally intersecting said longitudinal center line, each rod connecting the free end of the arm of one of the front wheel trucks with that of the diagonally disposed rear wheel trucks, said operating connections including steering links diagonally disposed with regard to the longitudinal center line, and pivotally secured at one end intermediate the ends of one of the crossed members comprising the coupler element and the free ends of the rocker arm element, the laterally projecting arms for said wheel elements, the levers comprising the rocker arm element, the links, rods and cross members of the coupler elements being arranged in two sets, each set lying upon a different level with respect to the other set.

ROMAINE R. HARRIS.